US010938874B2

(12) United States Patent
Littlejohn et al.

(10) Patent No.: US 10,938,874 B2
(45) Date of Patent: Mar. 2, 2021

(54) MULTI-LEVEL MATCHING FACILITATING DELIVERY OF ENHANCED CONTENT

(71) Applicant: iHeartMedia Management Services, Inc., San Antonio, TX (US)

(72) Inventors: Jeff Littlejohn, Mason, OH (US); Bobbi Denise Schuster, San Antonio, TX (US); Keyin Hsu, San Antonio, TX (US); Jennifer L. Smith, San Antonio, TX (US)

(73) Assignee: iHeartMedia Management Services, Inc., San Antonio, TX (US)

( * ) Notice: Subject to any disclaimer, the term of this patent is extended or adjusted under 35 U.S.C. 154(b) by 0 days.

(21) Appl. No.: 16/901,137

(22) Filed: Jun. 15, 2020

(65) Prior Publication Data

US 2020/0314160 A1 Oct. 1, 2020

Related U.S. Application Data

(63) Continuation of application No. 16/106,242, filed on Aug. 21, 2018, now Pat. No. 10,693,931, which is a
(Continued)

(51) Int. Cl.
*H04H 7/00* (2006.01)
*H04L 29/06* (2006.01)
(Continued)

(52) U.S. Cl.
CPC ............ *H04L 65/60* (2013.01); *H04H 60/46* (2013.01); *H04H 60/66* (2013.01); *H04H 60/74* (2013.01); *H04L 12/18* (2013.01); *H04L 67/32* (2013.01)

(58) Field of Classification Search
CPC ........ H04H 60/46; H04H 60/74; H04H 60/66; H04H 60/41; H04H 60/44; H04H 60/45;
(Continued)

(56) References Cited

U.S. PATENT DOCUMENTS 5,893,110 A 4/1999 Weber et al.
6,552,254 B2 4/2003 Hasegawa et al.
(Continued)

*Primary Examiner* — Tuan Pham
(74) *Attorney, Agent, or Firm* — Garlick & Markison; Edward J. Marshall

(57) ABSTRACT

A server receives a message from a subscriber. The message includes a subscriber identifier and one or more one or more first identifying attributes associated with a first media-work played-out by the subscriber. The server performs a first-level match between the first identifying attributes and unique identifiers included in a database. In response to the first-level match indicating that the first identifying attributes do not include any of unique identifiers, the server performs a second-level match, which compares the first identifying attributes to content attributes of different media-works linked to the unique identifiers. In response to the second-level match identifying one or more matching first identifying attributes to the content attributes that are linked to a particular unique identifier included in the database, the server selects enhanced content based on the particular unique identifier, and delivers that enhanced content to the subscriber.

13 Claims, 7 Drawing Sheets

Related U.S. Application Data continuation of application No. 15/637,669, filed on Jun. 29, 2017, now Pat. No. 10,063,607, which is a continuation of application No. 15/279,826, filed on Sep. 29, 2016, now Pat. No. 9,729,597, which is a continuation of application No. 14/639,355, filed on Mar. 5, 2015, now Pat. No. 9,462,023, which is a continuation of application No. 12/475,288, filed on May 29, 2009, now Pat. No. 8,977,220.

(51) Int. Cl.
| | |
|---|---|
| *H04H 60/66* | (2008.01) |
| *H04H 60/74* | (2008.01) |
| *H04H 60/46* | (2008.01) |
| *H04L 12/18* | (2006.01) |
| *H04L 29/08* | (2006.01) |

(58) Field of Classification Search
CPC ......... H04H 60/48; H04L 65/60; H04L 12/18; H04L 67/32
See application file for complete search history.

(56) References Cited

U.S. PATENT DOCUMENTS

| | | | |
|---|---|---|---|
| 6,918,096 | B2 | 7/2005 | Hugh |
| 7,287,029 | B1 | 10/2007 | Craft et al. |
| 7,343,414 | B2 | 3/2008 | Lipscomb et al. |
| 7,653,574 | B2 | 1/2010 | Harper et al. |
| 7,725,454 | B2 | 5/2010 | Kamani et al. |
| 8,458,184 | B2 | 6/2013 | Dorogusker et al. |
| 8,935,236 | B2 | 1/2015 | Morita et al. |
| 9,462,023 | B2 | 10/2016 | Littlejohn et al. |
| 9,729,597 | B2 | 8/2017 | Littlejohn et al. |
| 2003/0033296 | A1 | 2/2003 | Rothmuller et al. |
| 2003/0126048 | A1 | 7/2003 | Hollar et al. |
| 2004/0148503 | A1 | 7/2004 | Sidman |
| 2004/0255322 | A1 | 12/2004 | Meadows et al. |
| 2005/0071283 | A1 | 3/2005 | Randle et al. |
| 2005/0209947 | A1 | 9/2005 | Shafer |
| 2005/0273445 | A1 | 12/2005 | Steelberg et al. |
| 2006/0116926 | A1 | 6/2006 | Chen |
| 2006/0161635 | A1 | 7/2006 | Lamkin et al. |
| 2006/0206582 | A1 | 9/2006 | Finn |
| 2006/0242554 | A1 | 10/2006 | Gerace et al. |
| 2007/0016922 | A1* | 1/2007 | Koch .................. H04N 21/462 725/35 |
| 2007/0118572 | A1 | 5/2007 | Fischer et al. |
| 2007/0162395 | A1* | 7/2007 | Ben-Yaacov .......... G06F 16/64 705/51 |
| 2007/0185879 | A1 | 8/2007 | Roublev et al. |
| 2008/0004977 | A1 | 1/2008 | Fisher |
| 2008/0092168 | A1 | 4/2008 | Logan et al. |
| 2008/0183757 | A1 | 7/2008 | Dorogusker et al. |
| 2009/0239557 | A1 | 9/2009 | Kadakia et al. |
| 2010/0262987 | A1* | 10/2010 | Imanilov ........... H04N 21/4622 725/9 |

\* cited by examiner

MULTI-LEVEL MATCHING FACILITATING DELIVERY OF ENHANCED CONTENT

CROSS-REFERENCE TO RELATED APPLICATIONS

The present U.S. Utility Patent Application claims priority pursuant to 35 U.S.C. § 120 as a continuation of U.S. Utility application Ser. No. 16/106,242, entitled "DELIVERY OF BROADCAST-RELATED CONTENT TAGGED BY OFFLINE DEVICE", filed Aug. 21, 2018, scheduled to issue as U.S. Pat. No. 10,693,931 on 6/23/2020, which is a continuation of U.S. Utility application Ser. No. 15/637,669, entitled "DELIVERY OF CONTENT ASSOCIATED WITH A BROADCAST WORK", filed Jun. 29, 2017, now U.S. Pat. No. 10,063,607 on Aug. 28, 2018, which is a continuation of U.S. Utility application Ser. No. 15/279,826, entitled "DELIVERY OF ENHANCED CONTENT RELATED TO A BROADCAST WORK", filed Sep. 29, 2016, now U.S. Pat. No. 9,729,597 on Aug. 8, 2017, which is a continuation of U.S. Utility application Ser. No. 14/639,355, entitled "DELIVERY OF ENHANCED CONTENT RELATED TO A BROADCAST WORK", filed Mar. 5, 2015, now U.S. Pat. No. 9,462,023 on Oct. 4, 2016, which is a continuation of U.S. Utility application Ser. No. 12/475,288 entitled "DELIVERING CONTENT ASSOCIATED WITH A UNIQUE IDENTIFIER", filed May 29, 2009, now U.S. Pat. No. 8,977,220 on Mar. 10, 2015, all of which are hereby incorporated herein by reference in their entirety and made part of the present U.S. Utility Patent Application for all purposes.

FIELD

The present disclosure relates generally to delivering content associated with a unique identifier, and more particularly to using the unique identifier to facilitate delivery of broadcast-related content tagged by an offline device.

BACKGROUND

Currently available commercial AM/FM radio broadcasts may include both primary content, for example a song, and secondary content, such as the song's title or the call letters and frequency of the radio station broadcasting the song. Radios that comply with various standards, for example High Definition (HD) or Radio Data Signal (RDS) radios can display the secondary content on a screen, while the primary content is being played on speakers. Other systems are known to broadcast primary and secondary content via an Internet radio station, thereby allowing an Internet user to listen to the primary content and view the secondary content using a computer equipped with a browser or other suitable software.

Both AM/FM and Internet broadcasts, therefore, essentially broadcast the same collection of primary and secondary content to everyone. These known arrangements are less than perfect.

SUMMARY

A processing system can provide media items and other broadcast information to a broadcaster, which broadcasts the media items to a user device that is not currently connected to the processing system via a communications network. Using the user device, a user can tag selected broadcast content when offline, and then transfer information about the tagged content to a processing system when the user device is eventually connected to a network. The processing system can identify content related to the tagged content, and upload that related content to the end user device.

Both the broadcast content and the information about the tagged content can include unified numbering system (UNS) identifiers, or time and station information. The processing system can use this information, in conjunction with user preferences in some cases, to select content to be uploaded to the end-user device. The content to be uploaded can include the tagged media item itself, sponsor contact information, or other types of content.

The present disclosure may also take the form of a system, method, and a non-transitory computer readable medium tangibly embodying a program of computer executable instructions.

BRIEF DESCRIPTION OF THE DRAWINGS

Aspects of this disclosure will become apparent upon reading the following detailed description and upon reference to the accompanying drawings, in which like references may indicate similar elements.

DETAILED DESCRIPTION

The following is a detailed description of embodiments of the disclosure depicted in the accompanying drawings. The embodiments are in such detail as to clearly communicate the disclosure. However, the amount of detail offered is not intended to limit the anticipated variations of embodiments; on the contrary, the intention is to cover all modifications, equivalents, and alternatives falling within the spirit and scope of the present disclosure as defined by the appended claims.

Various embodiments described in this disclosure permit content from a number of different content providers—each of which may utilize a different, proprietary numbering or identification scheme—to be accessed, processed, tracked, or otherwise handled based on an overarching, or unified numbering system (UNS). Such a numbering system, according to some embodiments of the present disclosure, can allow tracking of content from multiple different content libraries for various purposes. Various embodiments of the present disclosure can utilize a UNS to facilitate, for example, verifying that a particular work has been publicly performed, establishing royalty payments to organizations assigned to collect those payments, such as the American Society of Composers, Authors and Publishers (ASCAP) or Broadcast Music Incorporated (BMI), to set advertising rates, or the like.

Various embodiments can employ matching techniques to conform identifiers that might be used by multiple different music libraries, advertisers, or other content providers into a common, unified numbering system. For example, some embodiments include systems and methods that allow a song or other work having multiple different aliases to be linked or associated with a single unique identifier to facilitate tracking, or other suitable uses of information associated with a work.

Some embodiments can take advantage of a UNS as part of interactive content delivery. For example, a subscriber can provide a processing system with information about preferences, such as the type of information a user desires to receive in conjunction with the broadcast of a song or other work. One subscriber may request to receive information limited to song titles, while another can request information about an artist performing the song, the year the song was released, the song's chart ranking, or the like.

Various embodiments can deliver different information to different subscribers during a time when each of the different subscribers is receiving the same broadcast work. Furthermore, some embodiments permit a subscriber to record preferences on a portable device while receiving a broadcast of the work. The subscriber can subsequently connect the portable device to a network, such as the Internet, to provide the preferences to a server, which will respond to the subscriber's preferences by providing content associated with the work being broadcast at the time the subscriber recorded his preference.

Figure 1:
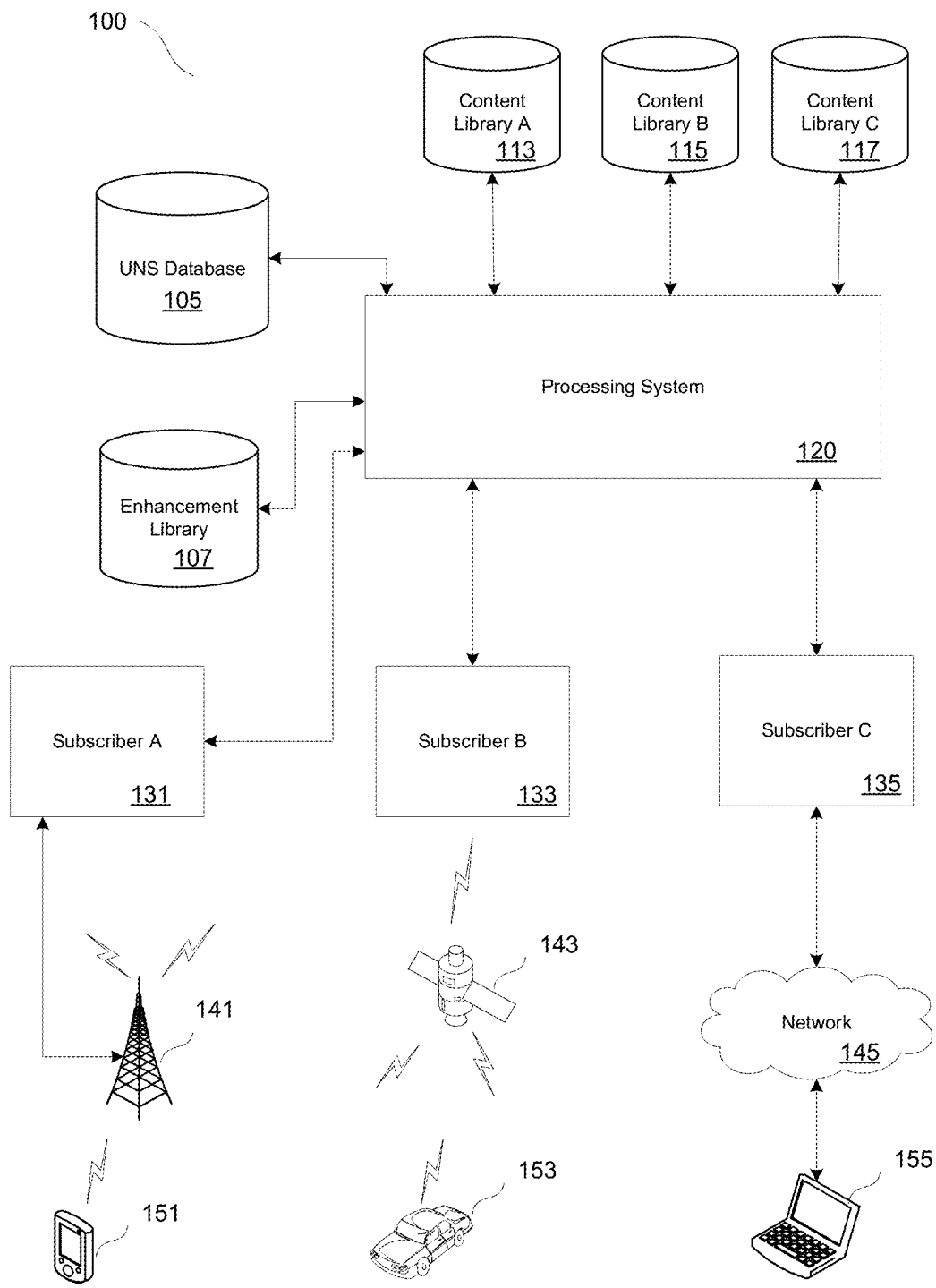
FIG. 1 is a block diagram of a broadcasting system employing a unified numbering system (UNS) to deliver content to subscribers according to an embodiment of the present disclosure.

Referring to FIG. 1, a block diagram of a broadcasting system employing a UNS is illustrated according to an embodiment of the present disclosure. System 100 includes processing system 120, which is in communication with content library A 113, content library B 115, and content library C 117. Processing system 120 may also be in communication with a UNS database 105 and an enhancement library 107. Content library A 113 can provide processing system 120 with information associated with various works, including songs, advertisements, or the like, indexed using a proprietary, or nonproprietary numbering or other identification system. The indexing format in which content library A 113 provides information to processing system 120 may be different from the indexing format of information provided by content library B 115, and different still from that used by content library C 117. Processing system 120 can receive information from all three content libraries 113 115 and 117, and assign each work from the various content libraries a unique number. The unique number associated with each element of content provides a single unified numbering system for all the content, regardless of its source.

Processing system 120 can also be in communication with UNS database 105 and enhancement library 107. UNS database 105 can store unique identifiers and other information linking content from content libraries A 113, B 115, and C 117 in a uniform manner. So, for example, when processing system 120 receives content, a numeric, alphanumeric, or other identifier selected from a single set of identifiers can be associated with the received content, and the identifier stored in UNS database 105.

In some embodiments, UNS database 105 stores not only identifiers associated with received content, but also the content itself, and other related information. For example, when processing system 120 retrieves content from one of the content libraries A 113, B 115, or C 117, processing system 120 can also retrieve enhanced content from enhancement library 107. An association can be established between the information received from enhancement library 107 and content retrieved from content libraries A 113, B 115, or C 117. In some embodiments, the enhanced content may be added, updated, or otherwise integrated with content received from content libraries A 113, B 115, or C 117, and stored along with that content in UNS database 105.

Enhanced content from enhancement library 107 may include information such as song titles, song length, song release dates, artists, authors, owners, aliases, chart rankings, or other desired information. It should be noted that content from content libraries A 113, B 115, and C 117 is not necessarily limited to songs and information related to songs. For example, content library A 113 may include video and related information, content library B 115 may store audio and related information, and content library C 117 may provide commercial information such as advertisements or the like.

The various types of content contained in content libraries A 113, B 115, and C may be referred to as "works" in the present disclosure. Furthermore, as used herein, the term "works" is intended to include at a minimum content that falls within the meaning of works as used in copyright law, but is not intended to be limited to only copyright eligible content. Instead, the term works is meant to be interpreted in its broadest sense as including any of various perceivable content that may be delivered by processing system 120, or another suitable processing system, to subscribers, end-users, or other systems.

As used herein, the term "subscriber" is intended to encompass not only individuals, companies, or other entities who pay a fee or register to receive particular services, although such entities are envisioned within the term subscriber. Instead, the term subscriber may also include individual end-users, viewers and listeners, or other entities to which processing system 120 may deliver a work, regardless of whether the delivered work includes enhanced content or otherwise. In some embodiments, for example, "subscriber" may refer to an intermediary, such as a broadcaster. But "subscriber" may also refer to an end user who receives the content from the broadcaster.

Processing system 120 can be used to provide works and related content to subscriber A 131, subscriber B 133, and subscriber C 135. Subscriber A 131 can receive information from processing system 120 and provide that information via broadcast equipment 141 to a portable receiver 151. Note that broadcast equipment 141 can include any of various terrestrial broadcasting stations, units, and other equipment. Portable receiver 151 is depicted as a personal digital assistant (PDA), but is not so limited. Portable receiver 151 may also include any suitable portable or fixed location device, such as a cellular or other wireless telephone, a laptop or other mobile computing device, a portable radio, a digital or analog music player, or the like, that allows a user in possession of the device to receive broadcast signals or other terrestrial wireless signals from broadcast equipment 141.

Likewise, processing system 120 can be used to provide works and related content to subscriber B 133, which in turn transmits information received from processing system 120 via satellite 143 to satellite receiver 153. Although satellite receiver 153 is depicted as a vehicle, it is not so limited, and may include any suitable device capable of receiving satellite broadcast signals. Such devices may include radios, digital or analog music players, mapping devices, or other similar devices capable of receiving a satellite signal.

Processing system 120 can also be used to provide works and related content to subscriber C 135, which can transmit received content to networked receiver 155 via network 145. Although networked receiver 155 is illustrated as a laptop computer, it is not so limited. Networked receiver 155 may include any of various devices capable of communication via a wireless or wired network, and can include various radios, personal computing devices, workstations, laptops, PDAs, smart phones, or the like.

Network 145 may include any of various local or wide area networks, including a public switched telephone network (PSTN), a cellular telephone network, a home or business local area network, or the like. Subscriber C 135 may be, for example, an Internet provider, television broadcaster, radio station, music service, or the like that provides works or associated content via network 145. Network 145 can include elements and subsystems in common with broadcast equipment 141 and satellite 143. Furthermore, a single device (not illustrated) may be capable of serving multiple functions, and may include communication interfaces permitting that single device to act as a portable receiver 151, a satellite receiver 153, and a networked receiver 15.

In general operation, processing system 120 can receive information from one or more of content library A 113, content library B 115, and content library C 117. The received information can be enhanced with information from enhancement library 107, and associated with a unique number from UNS database 105. Processing system 120 may store the information received from the content libraries in UNS database 105 or in another suitable storage device, or may simply pass through the content, enhanced or unenhanced, to one or more of subscriber A 131, subscriber B 133, and subscriber C 135. In addition to the content, processing system 120 can provide from UNS database 105 the unique identifier associated with the content.

The content provided to subscriber A 131 need not be the same content provided to subscriber B 133 or subscriber C 135. In some embodiments, for example although the same work is provided to multiple subscribers, each subscriber can be provided different enhanced content. Subscriber A 131, for example, may receive a minimal amount of enhanced content including a title, while subscriber B 133 receives additional enhanced content, such as a title, the work's release date, the work's highest Billboard chart ranking, and the name of the work's author. By providing subscriber A 131, subscriber B 133, and subscriber C 135 with content from one of content library A 113, content library B 115, and content library C 117 in conjunction with a unique identifier from UNS database 105 associated with that content, processing system 120 can provide improved tracking and monitoring of content delivered to portable receiver 151, satellite receiver 153, and networked receiver 155.

Figure 2:
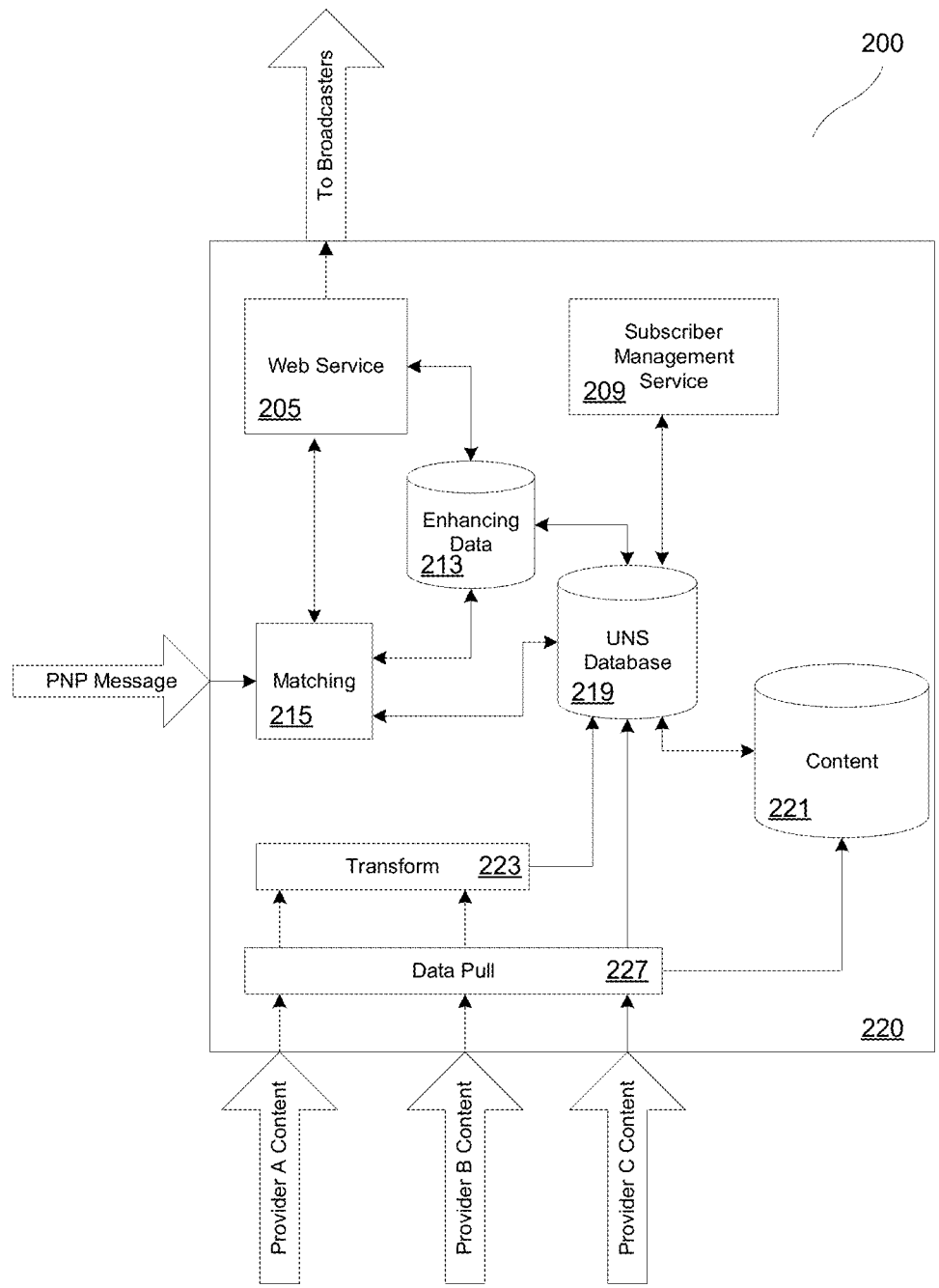
FIG. 2 is a block diagram illustrating the operation of a UNS processing system according to an embodiment of the present disclosure.

Referring next to FIG. 2, various embodiments of a processing system 200 are disclosed. Processing system 200 can receive works or other content from various sources, and can assign the works unique identifiers that are part of a unified numbering system. In some embodiments, a work is provided to a broadcaster along with its unique identifier. The broadcaster or another entity can provide a message to processing system 200 indicating that a work is being broadcast. In response to the message, processing system 200 can match the work identified in the message with one of the works assigned a unique number. The matching can permit more effective management of the works.

Processing system 200 can include server system 220, which can receive works from provider A, provider B, and provider C, and deliver enhanced information to broadcasters or other subscribers. Additionally, server system 220 can receive a push-now-playing (PNP) message from a broadcaster or other source indicating that a particular work is scheduled to be broadcast in the near future, or that the work is currently being broadcast. A PNP message, for example, can include a list of the next 10 songs, advertisements, spots, or other works a broadcaster is intending to broadcast or otherwise deliver to end users. The first work on the list can indicate a work that is currently being delivered, the second work can indicate the very next work to be delivered, and so on. In some embodiments, a series of one or more PNP messages can be received from each subscriber at predetermined periods of time, with each PNP message being updated with more recent information.

Server system 220 can include data pull subsystem 227, which obtains provider A content, provider B content, and provider C content; transformation subsystem 223, which can convert some or all of the content obtained by data pull subsystem 227 into a desired format usable by server system 220. In some embodiments, transformation subsystem 223 selectively converts songs, advertisements and other content based on whether or not the content is already in a format suitable for processing by the remainder of server system 220. For example, transformation subsystem 223 can transform provider A content and provider B content, but pass provider C content to other portions of server system 220 without transformation. In some embodiments, data pull subsystem 227 includes circuitry or logic that can deliver content directly to UNS database 219, content database 221, or another portion of server system 220, thereby bypassing transformation subsystem 223. In some embodiments, transformation subsystem 223 can leave the majority of the content received from data pull subsystem 227 unaltered, and be utilized primarily for transforming identifying information, such as proprietary numbering systems, into a suitable format for use by server system 220.

In some embodiments, songs, advertisements, and other works included in provider A content, provider B content, and provider C content can be stored in content database 221, while identifying information associated with the works is separated from the works and stored in UNS database 219, enhancing database 213, or another desired location separate from the location in which the works are stored. In some such embodiments, appropriate database links are stored along with the works and the identifying information, so that the relationships between the separately stored works and identifying information can be maintained. In some embodiments, however, works and identifying information can be stored together.

UNS database 219 can store unique identifiers and other information associated with works included in provider A content, provider B content, and provider C content. UNS database 219 can also exchange information with subscriber management service 209, content database 221, matching subsystem 215, and enhancing database 213. In some embodiments, enhanced data from enhancing database 213 and information from UNS database 219 can be provided to web service 205, which can in turn provide that information to broadcasters or other subscribers.

Subscriber management service 209 can include various tools to allow subscribers, to transmit their preferences to server system 220. Subscriber management service 209 can also provide a subscriber with the ability to add or remove particular works or associated content from information transmitted to the subscriber from server system 220. For example, a subscriber may indicate that he does not want to receive a particular song from server system 220, or that along with each song provided by server system 220 the subscriber wants to receive particular enhancing data—either for the subscriber's own consumption, or to be broadcast to end-users or other entities.

Matching subsystem 215 can match information included in incoming messages to information stored in the UNS database to facilitate tracking works that have been publicly performed. For example, a PNP message can include information associated with a work to be publicly perform, including a UNS identifier associated with a particular song. If a PNP message includes a UNS identifier, matching subsystem 215 verifies that UNS identifier included in the PNP message matches a UNS identifier stored in the UNS database. If the UNS identifier in the PNP message matches a UNS identifier stored in the UNS database, server system 220 can retrieve the work associated with the UNS identifier from content database 221 and enhancing data associated with the UNS identifier from enhancing database 213. The work and the enhancing data can be provided to web service 205, which in turn delivers to subscribers the work associated with the UNS identifier contained in the PNP message.

In some instances, the PNP message may not contain a UNS identifier. Where a PNP message does not contain a UNS identifier a work can be matched to a UNS identifier associated with a known work based on other information. For example, a PNP message can contain information such as a song's title, or the artist's name. A PNP message can also include a station identifier and an indication of when the work was broadcast. Matching subsystem 215 can attempt to identify which of the unique numbers in UNS database 219 is associated with a work having the same song title, artist, or other information included in the PNP message If a match is found, web service 205 can be provided with the work associated with the UNS identified, along with enhanced data from enhancing database 213. The desired type and scope of enhanced data provided to a broadcaster or other subscriber can be regulated based on indicated subscriber preferences, which can be stored in subscriber management service 209.

In some instances, a PNP message, may not include information that can be matched to a UNS identifier stored in UNS database 219. In that event, matching subsystem 215 can generate a no-match indicator, and provide that indicator to another system (not illustrated) for further review and matching by humans, if necessary.

Web service 205 can provide to subscribers content that includes a UNS identifier from UNS database 219. The UNS identifier can be provided in conjunction with an advertisement, a song, or other work. When a subscriber broadcasts or plays the work, it can provide server system 220 with a PNP message that indicates works that may be played, have been played, or are scheduled to be played. Server system 220, can use matching subsystem 215, along with the information included in the PNP message to ensure that the proper entity receives appropriate compensation for the use of their work. For example, rather than paying a fee based solely on the general popularity of a song, or the average number of times a work is aired, some embodiments facilitate payment of royalties based on the number of times a work is actually public performed. Likewise, rather than setting advertising rates based primarily on demographic data, server system 220 can determine each instance a particular spot is played, broadcast, or aired, and set advertising rates based on that determination.

Figure 3:
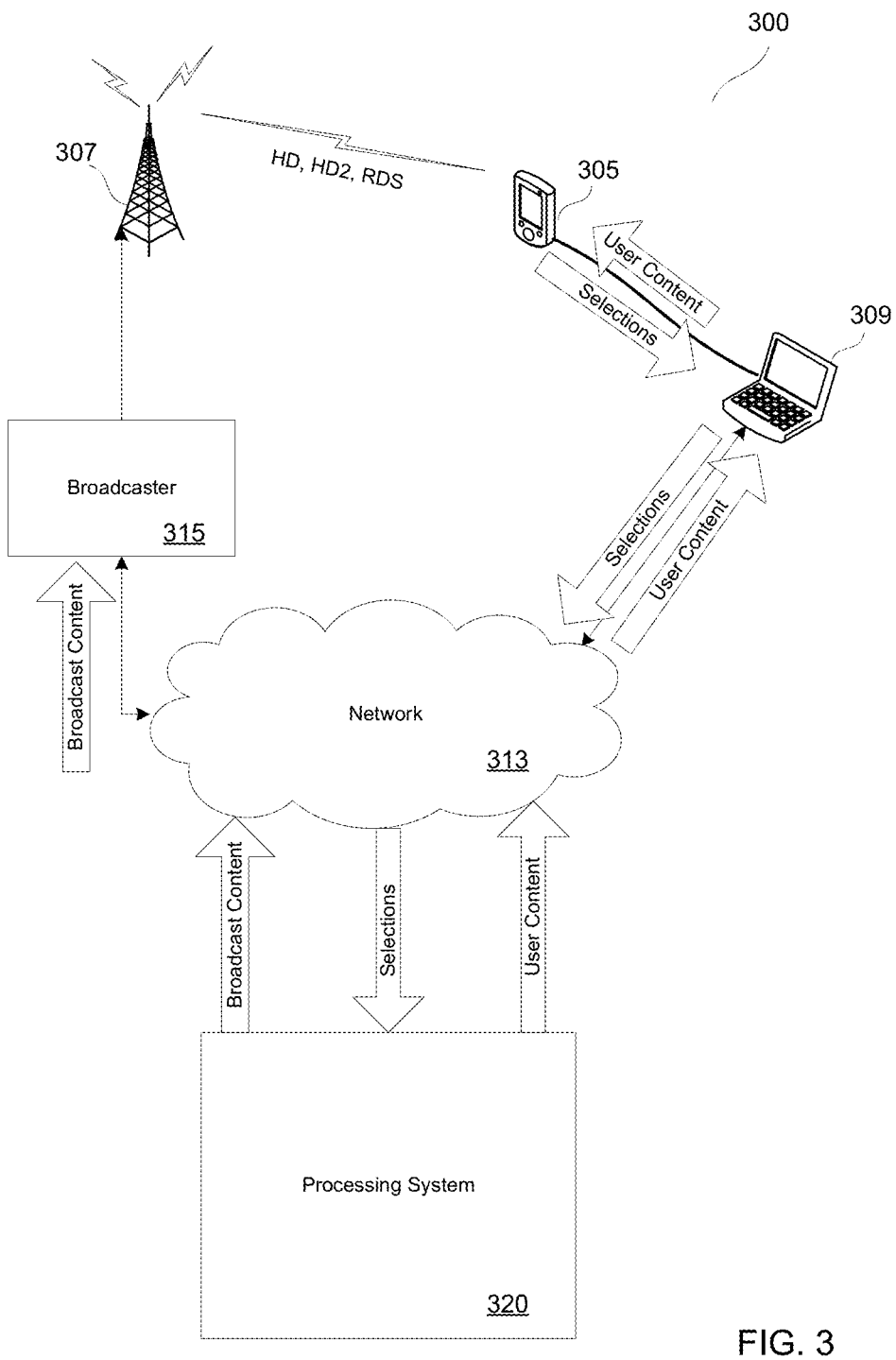
FIG. 3 is a diagram illustrating information flow between various elements of an interactive system according to an embodiment of the present disclosure.

Referring next to FIG. 3, an interactive system 300 according to various embodiments is disclosed. Interactive system 300 includes processing system 320, which can provide broadcast content to broadcasters 315, and can receive user selections generated at end-user device 305. User selections can be transmitted to processing system 320 via computer 309, which is connected to processing system 320 through networks 313. Processing system 320 can also provide user content to end-user device 305 based on the selections received from end-user device 305.

Broadcasters 315 can receive broadcast content via network 313, and transmit some or all of the received content utilizing broadcast equipment 307. The broadcast content can include songs, videos, advertisements, or other works to be broadcast. Broadcast content can also include enhanced content, a UNS identifier associated with the work or the enhanced content, and other information as desired. Some or all of the broadcast content may be used internally by the broadcaster, broadcast for reception by end user device 305, or both. The format of the content being broadcast by broadcasting equipment 307 can include HD, HD2, or RDS compliant radio signals, or other suitable broadcasting signal formats.

End-user device 305 may be equipped with a radio tuner that receives HD, HD2 or RDS radio signals that include information in addition to traditional AM/FM content. In some embodiments, however, end-user device 305 requires no special receiver equipment. End-user device 305 may also include a selection button (not illustrated) that allows a user of end-user device 305 to tag, mark, or otherwise select certain broadcast spots or other portions of a broadcast for future action. End-user device 305 may also include other selection mechanisms, including a touch screen device, a track ball, a wheel, or any other device suitable for controlling and selecting.

Consider the following example, in which end-user device 305 is receiving a broadcast of a song the user of end-user device 305 finds appealing. The user can press a selection button or otherwise utilize end-user device 305 to generate an indication that marks or tags the song, or marks the then-current time and station to which end-user device 305 is tuned. In some embodiments the selection can be made at any time during the song, or for a short period of time after the song has finished.

Later, when the end-user device can be connected to computer 309, for example via a docking station, a wireless connection, or otherwise, end-user device 305 can initiate a transfer of information indicating the earlier selection made by the user to processing system 320 via computer 309 and network 313. In some embodiments a device other than end-user device 305 may initiate the transfer. In response to receiving the user's selection, processing system 320 can upload user content to end-user device 305 via network 313 and computer 309. In some embodiments, the content sent by processing system 320 can be delivered to a destination other than end-user device 305, depending on user preferences. In some embodiments, delivery of content is subject to payment of a royalty or other fee.

The content provided by processing system 320 can include the tagged or marked song, advertisement, or other work, and may also include a work that was being played during the time the end user made his selection. In some embodiments, the content may also include enhanced content related to the selected work, including background information on the artist, a coupon to receive a promotional item, or other desired content. The functionality provided by some embodiments can find use in circumstances where a user may wish to contact a business sponsor, but may not have an immediate method of recording the sponsor's contact information. In such a case, a user can simply press a button and tag the spot, or commercial for delivery at a later time. Some embodiments utilize an end-user device 305 that includes wireless network connectivity functionality. In such a case, when a user hears the spot, the song, or the other content for which he wishes to receive additional information, he can contemporaneously retrieve the requested content from processing system 320.

Various embodiments of processing system 320 can deliver content based on subscriber preferences indicate the type of information a subscriber wishes to receive. These preferences can include, for example, an indication that upon selecting a song by a particular artist, the subscriber wishes to receive a list of other songs by the artist, or in the same genre, for possible purchase or simply for his own edification. In other embodiments, a subscriber may use end-user device 305 to indicate that he wants to receive concert dates for a selected artist, historical information about particular members of a band performing the selected work, or other desired content related to a song, music video, television program, or other work.

In some embodiments, if enough subscribers request the same types of information, processing system 320 may provide a notification to broadcaster 315 indicating the number of requests. In response to the notification, broadcaster 315 may then request processing system 320 to provide the additional information to the broadcaster 315, so that broadcaster 315 can broadcast the requested information. In other embodiments, multiple broadcasters in different areas (not illustrated) may receive the same work to be broadcast, but receive different enhancing information, such that the eventual broadcast by any particular broadcaster may be different than the broadcast of another broadcaster, even though both broadcasters are receiving the same work from processing system 320 concurrently.

Figure 4:
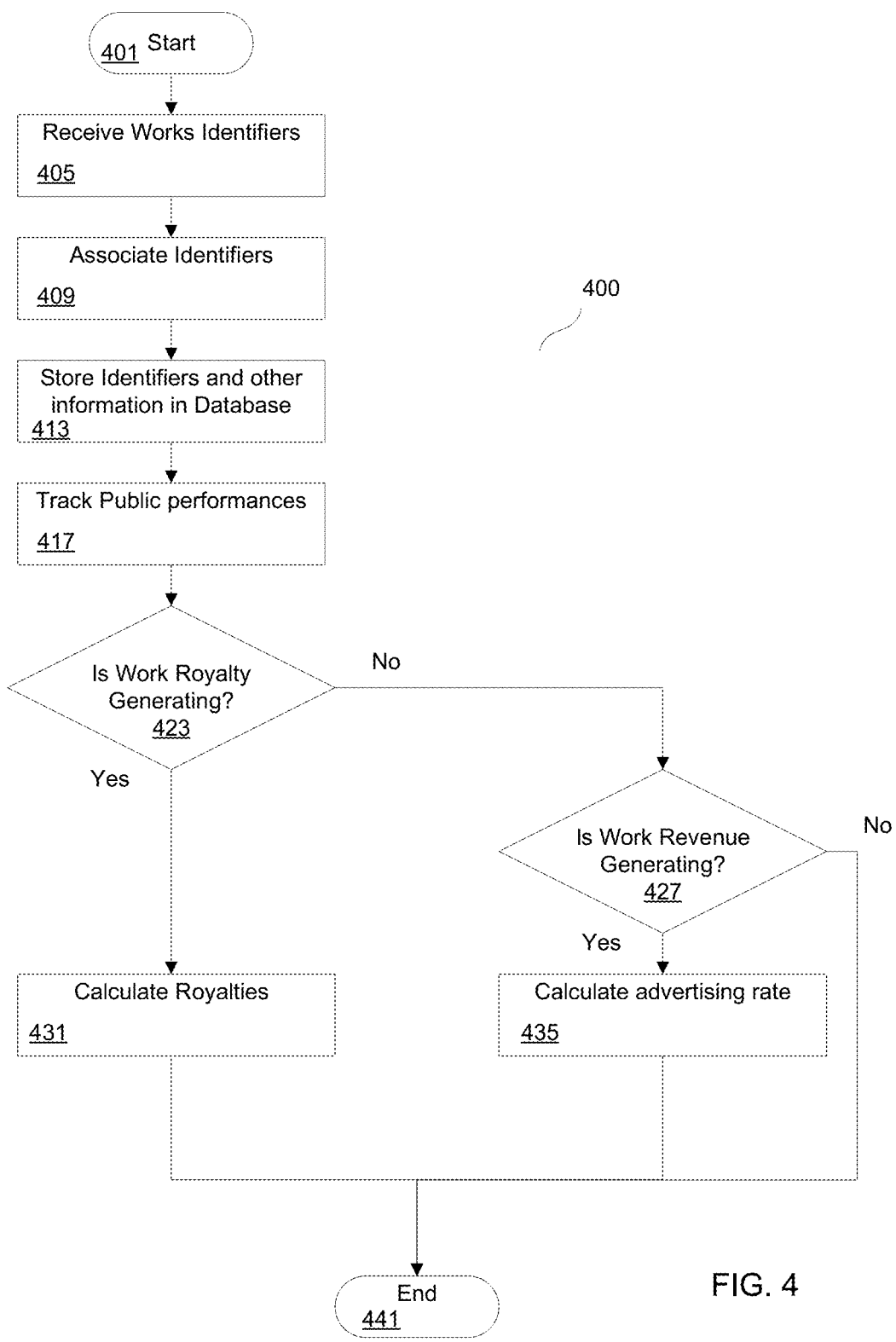
FIG. 4 is a flow diagram illustrating a method of tracking public performances according to an embodiment of the present disclosure.

Referring next to FIG. 4, a method 400 according to embodiments of the present disclosure is illustrated. Method 400 begins at block 401. As illustrated in block 405, a system employing a unified numbering system (UNS) receives identifiers identifying particular works, for example songs, advertisements, or other broadcast spots. In some embodiments, this includes receiving a PNP message that can include a UNS identifier or a non-UNS identifier, such as a song title, artist name, or the like. In some embodiments, identifiers can also be received from various content providers. Identifiers received from content providers can, in some instances, identifiers that are incompatible with identifiers used by one or more of the other content providers. The identifiers received from a content provider can include proprietary or non-proprietary identifiers, which are not necessarily incompatible with identifiers received from other content providers.

As illustrated in block 409, each of the received identifiers can be associated with an identifier selected from a set of unique, UNS identifiers. In some embodiments, the association can be accomplished based on a look-up procedure performed to determine if the identifier is a UNS identifier. In other instances, for example where the identifier is a non-UNS identifier, establishing an association with a UNS identifier can be performed by comparing an alias or other non-UNS identifier related to corresponding content associated with a work that is already associated with a UNS identifier. Thus, an association between a received identifier and a work already associated with a UNS identifier can be established, and on the basis of that association, the received work can be associated with a UNS identifier.

As illustrated in block 413, identifiers and other information can be stored in a database. In some embodiments, the identifiers and other information are stored together in a common database, while in some embodiments the identifiers are stored separately from other information and content. Thus, for example, one database implemented on one or more storage devices can be used for maintaining a database of UNS identifiers, another database can be sued to implement storage of various non UNS identifiers and associated content, and yet another database or set of databases can be used to store works themselves. In other embodiments, identifiers, associated content, works, and other information can be stored together in a single database, or in some other desired combination of databases.

As illustrated in block 417, the unique identifiers or other information associated with a work can be used to track public performances of the work. For example, a particular work can be identified based on a UNS identifier received in a push-now-playing (PNP) message. In some embodiments, the fact that a UNS identifier is included in a PNP message can be interpreted to mean that the work has been broadcast or otherwise publicly performed. Thus, if a list or some other collection of UNS identifiers that have been included in a PNP message is maintained, that list can be used to track which works have been publicly performed.

In some embodiments, various acknowledgement indicators, responses delivered via alternative media, or other suitable non-PNP messages may include UNS identifiers or other content that can also be used to track public performances of works. For example, a message can include time indicators, source indicators, or various other information allowing the public performance of a work to be tracked to particular individuals, businesses, broadcasters, or other entities with a desired degree of detail. Furthermore, in some embodiments, messages may not include UNS identifiers.

As illustrated in block 423, a determination can be made regarding whether a work is a song, movie, television show, or other royalty-generating work. The determination about whether the work is a royalty generating work can be made based on a UNS identifier or other information received in a PNP message or other message received from a subscriber or other entity, based on content associated with the work, or using another technique consistent with the present disclosure. For example, if a UNS identifier is associated with a copyrighted song, a royalty indicator flag, or some other suitable indicator, can be set in a UNS database, an enhancing database, a content database, or elsewhere.

As illustrated by block 431, if the work is of a type for which royalty payments might be due based on the work's public performance, royalties can be calculated. Royalty calculations can be based on an agreed amount due for each performance of the work, based upon various legal or statutory requirements, or set as otherwise desired. In some embodiments, the determination includes determining whether or not a royalty is due for a particular public performance of the work. Thus, the amount of royalties calculated can be zero. Note that as used herein, calculating royalties can include calculating a royalty rate.

As illustrated in block 427, if the work is not a royalty generating work, a decision can be made to determine if the work is a revenue generating work, for example an advertising spot or another type of work that someone pays to have broadcast. The determination about whether the work is a revenue generating work can be made based on a UNS identifier or other information received in a PNP message or other message received from a subscriber or other entity, based on content associated with the work, or using another technique consistent with the present disclosure.

As illustrated in block 435, if the work is an advertising spot or other revenue generating work, an advertising rate can be calculated. The advertising rate can be calculated using information related to tracked public performances. For example, a list, database, or other collection of UNS identifiers can indicate particular advertisements or other revenue generating works that have been publicly performed. Content associated with the UNS identifiers can include an advertiser's name, address, type of product being advertised, and other related information. Additionally, other information or content received in a PNP or other message can provide a market, a time of broadcast, or other desired information. Using some or all of this information in conjunction with a UNS number, can be used to calculate an advertising rate based on a number of times a particular work has been broadcast, in which market particular spots have been aired, or the like. Furthermore, some embodiments receive information associated with subscriber interaction with particular content. In some of these embodiments, calculating an advertising rate can include considering how many subscribers or other users actually interacted with particular portions of particular works. Note that as used herein, calculating an advertising rate can include calculating an actual amount of revenue related to a particular work.

As illustrated by block 441, if the work is neither a royalty generating work nor a revenue generating work, for example if the work is a public domain work, a news item, or the like, method 400 can end. As further illustrated by block 441, method 400 can end after calculation of royalties or an advertising rate.

Figure 5:
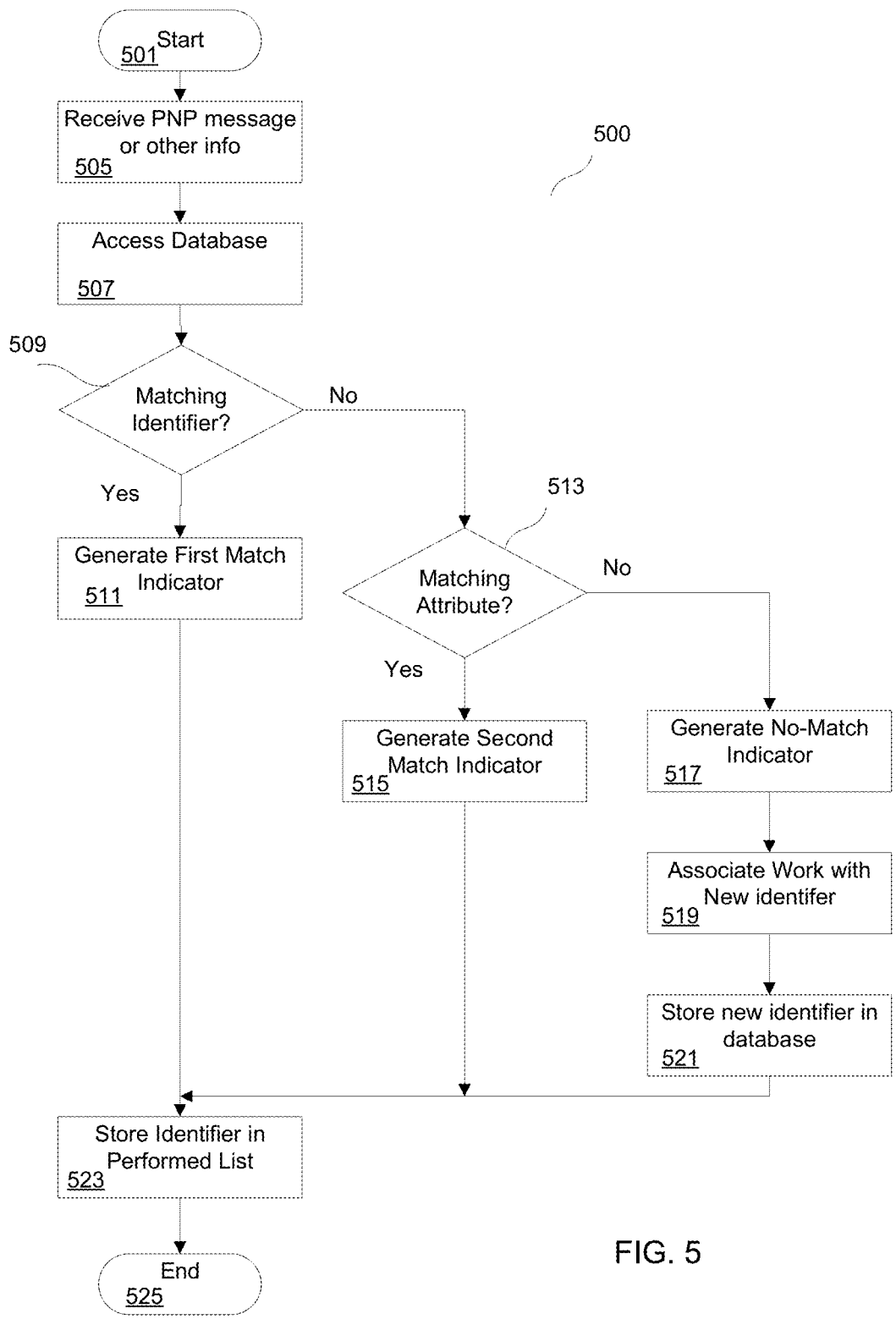
FIG. 5 is a flow diagram illustrating matching a work to a UNS identifier according to an embodiment of the present disclosure

Referring next to FIG. 5, a method 500 according to embodiments of the present disclosure is illustrated. Method 500 begins at block 501. As illustrated by block 505, information or other content related to a work can be received at a server or other processing system in the form of a push-now-playing (PNP) message sent from a broadcaster. In some embodiments, the received information can be received in a form other than a PNP message. For example, the information can be received in response to a request for information related to one or more works, or in conjunction with an upload of works or other related content. Furthermore, the information can be received from a source other than a broadcaster; for example, an individual subscriber or a content provider.

In some embodiments, the received information can include a UNS identifier, a non-UNS identifier, an alias, or attributes such as a title, author, or length. In some embodiments, the received information can be associated with a broadcast work, such as a song or advertisement, or with a work that has been or will be delivered to a targeted individual or group. In some embodiments, the information relates to a work that is being delivered from a content provider. In various embodiments, an attempt can be made to match a work associated with the received content with a work that has been previously associated with a unique identifier stored in a UNS database.

As illustrated in block 507, in response to receiving content or other information related to a work, one or more databases can be accessed by a server or processing system. The accessed databases may reside local to the server or other processing system. In some embodiments, the accessed databases can be a remote database maintained by a content provider, a broadcaster, or otherwise. Furthermore, the one or more of the accessed databases can be distributed across multiple physical locations and machines, maintained in a single location using a single machine, or some combination of the above. In at least one embodiment, the accessed database includes a unified number system (UNS) database associating a unique identifier with a particular work, and information associated with that work.

As illustrated by block 509, data obtained by accessing one or more databases can be used in matching a work associated with received information with a work previously associated with a UNS identifier. For example, the received information can be checked to see if it includes a UNS identifier, and if so, the received UNS identifier can be compared to UNS identifiers stored in a UNS database. If the received UNS identifier matches a UNS identifier stored in the UNS database, a match indicator can be generated.

As illustrated by block 511, a first match indicator can be generated if a UNS identifier received in a PNP message, in conjunction with a work, or from some other source, matches a UNS identifier stored in a UNS database. The first match indicator can include setting or appending one or more flag bits to the received identifier, generating a new message independent of the received UNS identifier, storing a link to the location of the matched UNS identifier within the UNS database, or employing other suitable indication techniques consistent with the present disclosure.

As illustrated by block 513, if the received information includes what appears to be a UNS identifier, but the received UNS identifier does not match a UNS identifier stored in a UNS database, or if the received information does not include anything that appears to be a UNS identifier, an attempt can be made to match based on attributes. The received information can include attributes associated with a work, for example an alias, a title, an artist name, a broadcaster identifier, a time identifier, or other desired attributes associated with a work. Various databases, for example a UNS database, an enhanced content database, a scheduling database, or the like can include information that relates and associates a work to a unique identifier. The received attributes can be compared to the attributes in the various databases in an attempt to match the received attributes to the attributes of a work previously associated with a UNS identifier.

For example, consider the case in which received attributes include a title, artist, length and an air time. Assume further that data obtained from one or more databases shows that attributes of a particular work associated with a particular UNS identifier match the received attributes. The conclusion can then be reached that the received attributes refer to the work associated with that particular UNS identifier.

In some embodiments, a desired level of certainty can be set as a limit for considering whether the attributes match. For example, if a threshold of 70% is used, then 7 out of 10 attributes could be required to exactly match before block 513 would return a positive indication. In some embodiments, ranges can be used. For example, a received attribute indicating an air time of 16 seconds after 5:05 pm can be considered to match an attribute of 5:04 and 59 seconds, because the two attributes differ by less than 30 seconds. Other limits and thresholds may also be used. Furthermore, various matching techniques, for example translation of all numbers expressed as words into numerical values, root analysis, and noise-word removal can also be utilized in a matching process according to some embodiments of the disclosure.

As illustrated in block 515, after the received attributes are matched to the attributes of a work associated with a UNS identifier, a second match indictor can be generated. The second match indicator, like the first match indicator, can include setting or appending one or more flag bits to the received identifier, generating a new message independent of the received UNS identifier, storing a link to the location of the matched UNS identifier within the UNS database, or employing other suitable indication techniques consistent with the present disclosure.

As illustrated in block 517, if the received information does not include either a UNS identifier that matches an existing UNS identifier, or attributes that match the attributes of a work associated with an existing UNS identifier, a no-match indicator can be generated. Like the first and second match indicators, the no-match indicator may take the form of a flag, a message, a physical indication, or some other suitable indicator consistent with the teachings of the present disclosure.

As illustrated in block 519, in response to the no-match indictor, a work associated with the received information can be assigned new UNS identifier. In some embodiments, assigning a new UNS identifier to the work associated with the received information can include generating a work order, email or other message indicating that manual action might be required. In some embodiments, however, especially when the received information includes a work, may not require manual action. For example, in the case where a content provider sends a work and related content to be catalogued for the first time, there may not be a UNS identifier associated with either the work or any other work having the same attributes. In that case, the work can be stored in a content database, the content and attributes associated with the work can be stored in an enrichment database, and the UNS identifier assigned to that work can be stored in a UNS database, as illustrated by block 521. In some embodiments, the UNS identifier can be stored without storing the remainder of the information. Furthermore, some or all of the received information can be stored together or separately in one or a number of databases.

As illustrated by block 523, after a work has been matched to or associated with a UNS identifier, the UNS identifier can be stored in a performance list. It should be noted that various embodiments, for example embodiments that do not implement tracking, can omit block 523, as desired. The performance list can include any of various types of works, including advertisement spots, songs, television shows, or other media content that has been provided, performed, or broadcast. By storing the UNS identifier in a performed list, a more accurate accounting of royalties due, advertising payments due, or various royalty and advertising rates can be calculated. Method 500 ends as illustrated by block 525.

Figure 6:
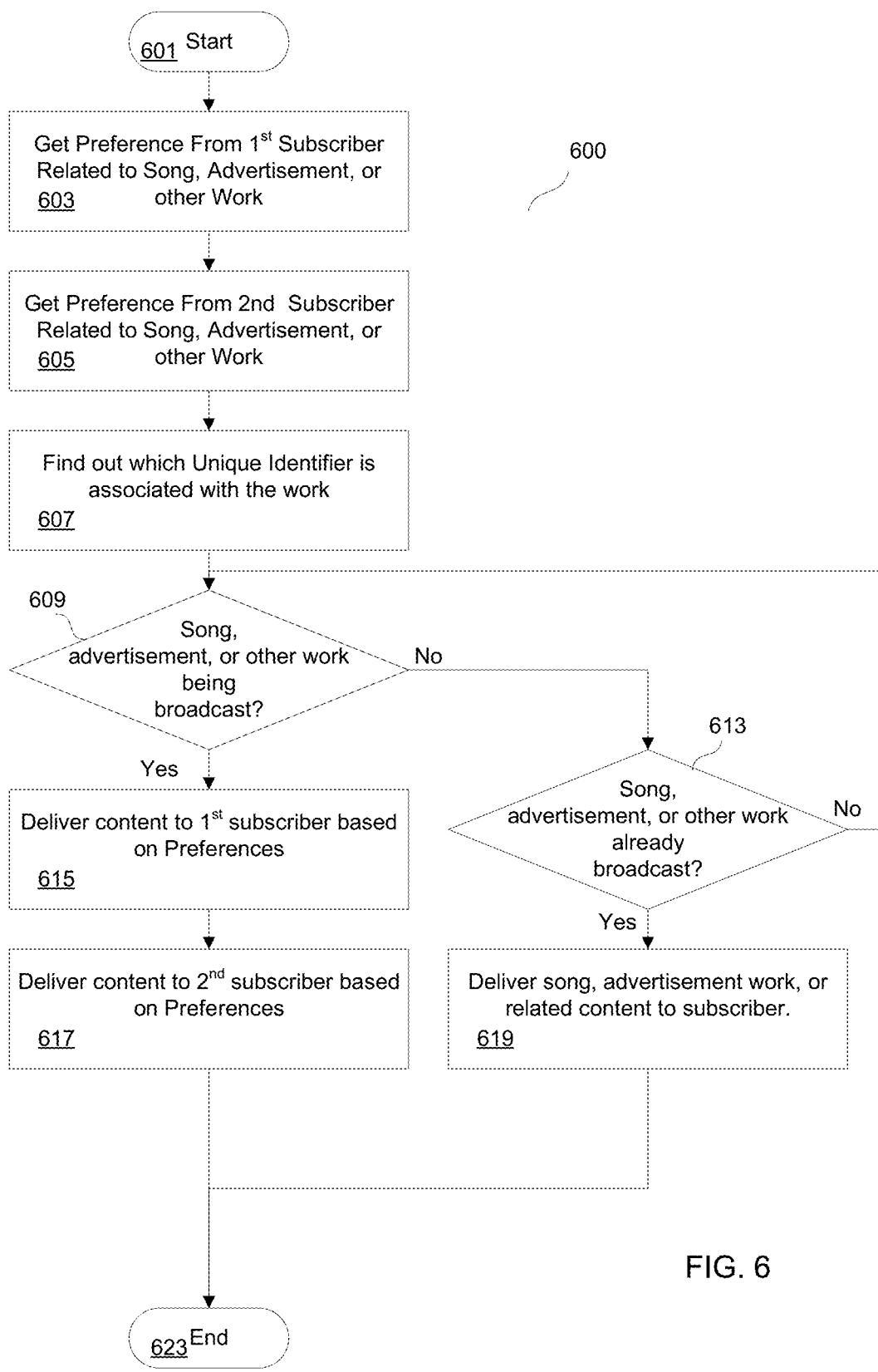
FIG. 6 is a flowchart illustrating interactive delivery of content according to an embodiment of the present disclosure.

Referring next FIG. 6, a method 600 according to an embodiment of the present disclosure is illustrated. Method 600 begins as illustrated by block 601. As illustrated by block 603, a subscriber preference related to a song, advertisement, or other work. In some embodiments, the subscriber may include a broadcaster or other entity that provides works to others via a broadcast medium such as radio or the Internet. A subscriber may also include an end user or consumer to whom works are provided. The subscriber preference may include an indication about which particular works a subscriber wants to receive, which information related to a work the subscriber wishes to receive, the method by which the work or related content is to be delivered, the frequency with which the subscriber wants to receive information, the criticality of delivery, alternate preferences, or other desired information.

In some embodiments, the preference may include a UNS identifier indicating a work that has been delivered to a user. A preference may also include a UNS identifier associated with a work related to another work, which has been received by a subscriber via broadcast, Internet, or other means. A preference from a broadcaster, for example, may include the UNS identifier of a work for which a subscriber desires to obtain additional attributes or related content. In some embodiments, a preference may include the UNS identifier of a song a subscriber wants downloaded to a song repository or content database. In some embodiments, preferences may not include UNS identifiers.

Subscriber preferences can be received via any of various sources, including unsolicited messages, responses to inquiries, or third party services. Furthermore, the preferences can be delivered via the PSTN, the Internet, Satellite, cellular telephones, wireless networks, or other suitable transmission media.

As illustrated by block 605, preferences from a second subscriber can also be received. In some embodiments, the preferences from the second subscriber can relate to the same work to which preferences from another subscriber relate, although the preferences themselves are different. In one or more embodiments, the preferences can relate to all works to be received by the subscribers from a particular source. For example, one subscriber may submit a preference that indicates one subscriber wants to receive a song's title and the artist's name whenever a song is received via an HD2 broadcast, while another subscriber may indicate that he wants to receive a song's highest popularity rating in addition to the song's title and the artist's name. Furthermore, one of the subscriber's may indicate that he wishes to receive other content or information via a second medium for every song broadcast during a particular time frame.

As illustrated by block 607, the unique UNS identifier associated with the work for which the first subscriber and the second subscriber indicated preferences can be determined utilizing various techniques consistent with the present disclosure. For example, the UNS identifier can be included in the subscriber preferences, or the preferences may be matched to a UNS identifier based on associated content, attributes, or otherwise.

As illustrated by block 609, a determination can be made regarding whether the song advertisement or other work referred to in a subscriber's preference is currently being broadcast. The determination can be made based on information contained in the subscriber preferences, based on the content of a PNP message, based on a playlist, a list of provided content, or another desired technique consistent with the present disclosure.

As illustrated by blocks 615 and 617, in some embodiments, content can be delivered to the first subscriber and the second subscriber in response to a determination that a particular work is currently being broadcast or otherwise provided to the first and second subscriber. The content to be delivered to the first subscriber can be based on the first subscriber's preferences, while the content delivered to the second subscriber can be based on the second subscriber's preferences. Thus, in some embodiments, even though the same work is being provided to both the first subscriber and the second subscriber, each subscriber can receive different additional content related to the work.

As illustrated by block 613, if a work referred to by the subscribers' preferences is not currently being broadcast or otherwise delivered, a determination can be made regarding whether or not a work referenced by the subscribers' preferences has been previously broadcast. The determination can be based on content included in one or more of the subscriber preferences, information retrieved from one or more databases, information included in a PNP or other message, or in another suitable manner consistent with the principles of the present disclosure.

As illustrated in block 619, in response to a determination that the song or other work has been previously broadcast or otherwise publicly performed, the song, advertisement, work or other related content can be delivered to subscribers. Method 600 ends as illustrated by block 623.

It should be appreciated that although the illustrated embodiments primarily providing content based on a work being currently or previously broadcast, in some embodiments, content can be provided to a subscriber while a work is pending broadcast or delivery.

Figure 7:
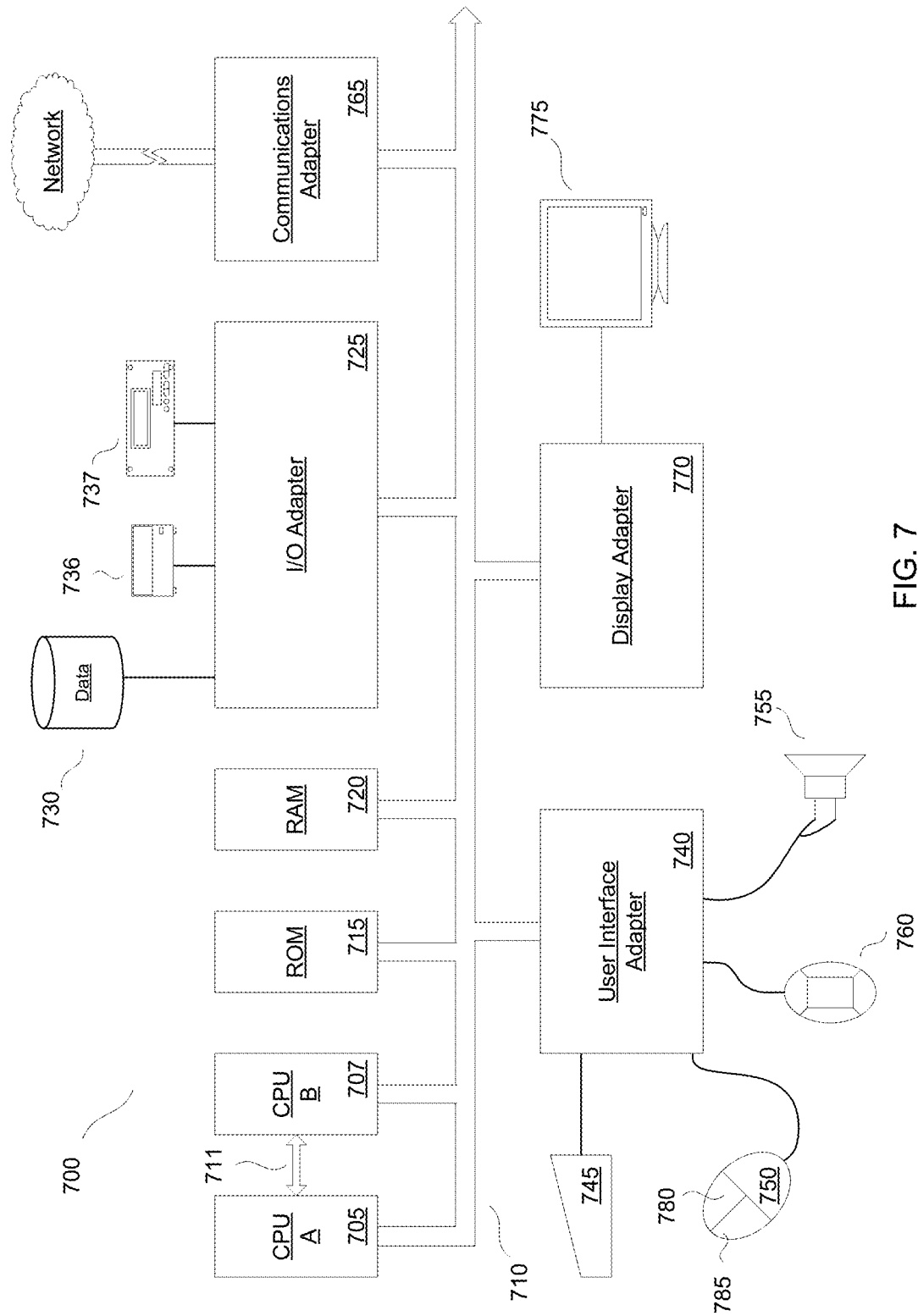
FIG. 7 is a high-level block diagram of a processing system according to embodiment of the present disclosure.

The methods and processes discussed previously, as well as other embodiments, may be implemented in a processing system executing a set of instructions stored in memory, or on a removable computer readable medium. An example of a system according to some embodiments is illustrated in FIG. 7. Referring now to FIG. 7, a high-level block diagram of a processing system is illustrated and discussed. Processing system 700 includes one or more central processing units, such as CPU A 705 and CPU B 707, which may be conventional microprocessors interconnected with various other units via at least one system bus 710. CPU A 705 and CPU B 707 may be separate cores of an individual, multi-core processor, or individual processors connected via a specialized bus 711. In some embodiments, CPU A 705 or CPU B 707 may be a specialized processor, such as a graphics processor, other co-processor, or the like.

Processing system 700 includes random access memory (RAM) 720; read-only memory (ROM) 715, wherein the ROM 715 could also be erasable programmable read-only memory (EPROM) or electrically erasable programmable read-only memory (EEPROM); and input/output (I/O) adapter 725, for connecting peripheral devices such as disk units 730, optical drive 736, or tape drive 737 to system bus 710; a user interface adapter 740 for connecting keyboard 745, mouse 750, speaker 755, microphone 760, or other user interface devices to system bus 710; communications adapter 765 for connecting processing system 700 to an information network such as the Internet or any of various local area networks, wide area networks, telephone networks, or the like; and display adapter 770 for connecting system bus 710 to a display device such as monitor 775. Mouse 750 has a series of buttons 780, 785 and may be used to control a cursor shown on monitor 775.

It will be understood that processing system 700 may include other suitable data processing systems without departing from the scope of the present disclosure. For example, processing system 700 may include bulk storage and cache memories, which provide temporary storage of at least some program code in order to reduce the number of times code must be retrieved from bulk storage during execution.

Various disclosed embodiments can be implemented in hardware, software, or a combination containing both hardware and software elements. In one or more embodiments, the invention is implemented in software, which includes but is not limited to firmware, resident software, microcode, etc. Some embodiments may be realized as a computer program product, and may be implemented as a computer-usable or computer-readable medium embodying program code for use by, or in connection with, a computer, a processor, or other suitable instruction execution system.

For the purposes of this description, a computer-usable or computer readable medium can be any apparatus that can contain, store, communicate, propagate, or transport the program for use by or in connection with the instruction execution system, apparatus, or device. By way of example, and not limitation, computer readable media may comprise any of various types of computer storage media, including volatile and non-volatile, removable and non-removable media implemented in any suitable method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer. Data structures and transmission of data (including wireless transmission) particular to aspects of the disclosure are also encompassed within the scope of the disclosure.

Various embodiments have been described for delivering content related to a commercial media program. Other variations and modifications of the embodiments disclosed may be made based on the description provided, without departing from the scope of the invention as set forth in the following claims.

What is claimed is:

1. A method for use in a server device including a processor and associated memory, the method comprising:
   receiving a message from a subscriber, the message including:
      a subscriber identifier;
      one or more first identifying attributes associated with a first media-work played-out by the subscriber;
   performing a first-level match between the one or more first identifying attributes and a plurality of unique identifiers included in a database, the plurality of unique identifiers linking content attributes of different media-works to different unique identifiers, the first-level match including:
      comparing the one or more first identifying attributes to the plurality of unique identifiers to determine whether the one or more first identifying attributes include a first unique identifier matching any of the plurality of unique identifiers;
   in response to the first-level match indicating that the one or more first identifying attributes do not include any of the plurality of unique identifiers, performing a second-level match, the second-level match including:
      comparing the one or more first identifying attributes to the content attributes of the different media-works to attempt to identify one or more matching content attributes, wherein the one or more matching content attributes match the one or more first identifying attributes;
   in response to identifying one or more matching content attributes linking the first media-work to a particular unique identifier included in the database, the particular unique identifier is linked to the one or more matching content attributes;
   selecting enhanced content based on the particular unique identifier; and
   delivering the enhanced content to the subscriber.

2. The method of claim 1, wherein receiving a message from a subscriber includes:
receiving information indicating that the first media-work is being played-out by the subscriber.

3. The method of claim 1, wherein the message from the subscriber includes a list of media-works.

4. The method of claim 1, wherein the content attributes include media-work aliases.

5. The method of claim 4, wherein:
at least one of the plurality of unique identifiers is associated with a plurality of different media-work aliases identifying a same media-work.

6. The method of claim 1, further comprising:
in response to both: the first-level match indicating that the one or more first identifying attributes do not include any of the plurality of unique identifiers; and the second-level match failing to identify one or more matching content attributes linking the first media-work to any unique identifier included in the database:
associating the one or more first identifying attributes with another unique identifier; and
storing the another unique identifier in the database.

7. The method of claim 1, further comprising:
selecting the enhanced content based on subscriber preferences indicating a type of enhanced content to be delivered.

8. A server device comprising:
a processor;
memory coupled to the processor;
a database storing a plurality of unique identifiers linking content attributes of different media-works to different unique identifiers;
at least one communications interface coupling the processor to the database and to a communications network;
the communications interface configured to receive a message from a subscriber, the message including:
a subscriber identifier;
one or more first identifying attributes associated with a first media-work played-out by the subscriber;
the processor configured to:
perform a first-level match between the one or more first identifying attributes and the plurality of unique identifiers, the first-level match including:
compare the one or more first identifying attributes to the plurality of unique identifiers to determine whether the one or more first identifying attributes include a first unique identifier matching any of the plurality of unique identifiers;
in response to the first-level match indicating that the one or more first identifying attributes do not include any of the plurality of unique identifiers, perform a second-level match, the second-level match including:
compare the one or more first identifying attributes to the content attributes of the different media-works to attempt to identify one or more matching content attributes, wherein the one or more matching content attributes match the one or more first identifying attributes;
in response to the second-level match identifying matching content attributes, link the first media-work to a particular unique identifier included in the database, wherein the particular unique identifier is already linked to the one or more matching content attributes;
select enhanced content based on the particular unique identifier; and
deliver the enhanced content to the subscriber via the communications interface.

9. The server of claim 8, wherein the at least one communications interface is further configured to:
receive information indicating that the first media-work is being played-out by the subscriber.

10. The server of claim 8, wherein the message from the subscriber includes a list of media-works.

11. The server of claim 8, wherein the content attributes include media-work aliases.

12. The server of claim 11, wherein:
at least one of the plurality of unique identifiers is associated with a plurality of different media-work aliases identifying a same media-work.

13. The server of claim 8, wherein the processor is further configured to:
in response to both: the first-level match indicating that the one or more first identifying attributes do not include any of the plurality of unique identifiers; and the second-level match failing to identify one or more matching content attributes linking the first media-work to any unique identifier included in the database:
associating the one or more first identifying attributes with another unique identifier; and
storing the another unique identifier in the database.

* * * * *